(12) United States Patent
Dan et al.

(10) Patent No.: US 7,596,062 B2
(45) Date of Patent: Sep. 29, 2009

(54) METHOD OF PREVENTING OPTICAL RECORDING MEDIA FROM BEING FRACTURED AND APPARATUS THEREOF

(75) Inventors: Byung-Ju Dan, Gyeonggi-Do (KR); Jong-Man Kim, Seoul (KR); Hyo-Kune Hwang, Gyeonggi-Do (KR); Wae-Yeul Kim, Gyeonggi-Do (KR); Nam-Woong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 470 days.

(21) Appl. No.: 10/939,187

(22) Filed: Sep. 9, 2004

(65) Prior Publication Data

US 2005/0052967 A1  Mar. 10, 2005

(30) Foreign Application Priority Data

Sep. 9, 2003 (KR) .................. 10-2003-0063395
Oct. 22, 2003 (KR) .................. 10-2003-0073950

(51) Int. Cl.
*G11B 7/00* (2006.01)
(52) U.S. Cl. ............... 369/44.32; 369/53.15; 369/44.25
(58) Field of Classification Search .............. 369/44.32, 369/53.15, 44.25
See application file for complete search history.

(56) References Cited

U.S. PATENT DOCUMENTS

| | | | |
|---|---|---|---|
| 5,343,454 A * | 8/1994 | Watanabe et al. | 369/44.32 |
| 5,432,764 A * | 7/1995 | Chiyomatsu | 369/44.25 |
| 6,195,322 B1 * | 2/2001 | Ohtani et al. | 369/53.14 |
| 6,914,864 B1 * | 7/2005 | Teng et al. | 369/53.15 |
| 7,054,241 B2 * | 5/2006 | Kondo et al. | 369/44.32 |
| 7,088,657 B1 * | 8/2006 | Beckman | 369/53.15 |
| 2002/0105876 A1 * | 8/2002 | Byun et al. | 369/53.15 |
| 2003/0214891 A1 * | 11/2003 | Koh | 369/53.18 |
| 2004/0130982 A1 * | 7/2004 | Lee et al. | 369/44.32 |
| 2004/0218493 A1 * | 11/2004 | Hsu et al. | 369/53.14 |
| 2005/0024998 A1 * | 2/2005 | Inoue et al. | 369/44.29 |

FOREIGN PATENT DOCUMENTS

KR   10-0408396   11/2003

* cited by examiner

*Primary Examiner*—Wayne R Young
*Assistant Examiner*—Linh T Nguyen
(74) *Attorney, Agent, or Firm*—Lee, Hong, Degerman, Kang & Waimey

(57) ABSTRACT

Disclosed is a method of preventing optical recording media from being fractured and apparatus thereof, which enable to prevent an optical disc of an optical disc drive from being fractured due to a crack. The method and apparatus comprise: detecting a first tracking error signal outputted from a data recording/reproducing apparatus when the optical recording media are rotated at a first speed; detecting a second tracking error signal outputted from the data recording/reproducing apparatus when the optical recording media are rotated at a second speed; determining whether or not the crack on the optical disc exists on the basis of the first tracking error signal and the second tracking error signal; and stopping an operation of the data recording/reproducing apparatus when the optical recording media have the crack.

18 Claims, 9 Drawing Sheets

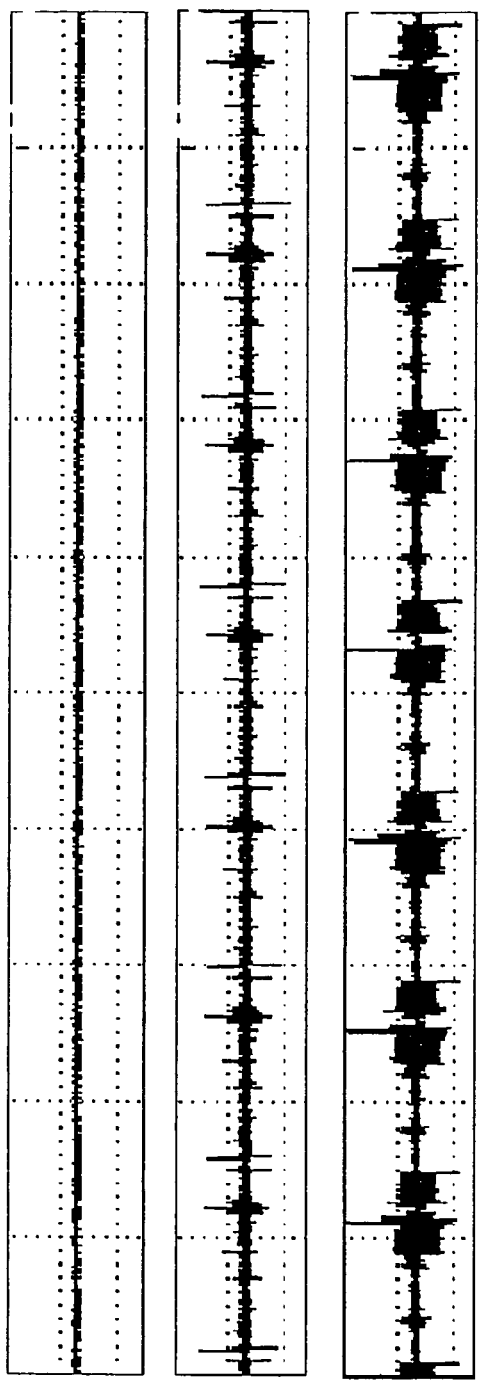

METHOD OF PREVENTING OPTICAL RECORDING MEDIA FROM BEING FRACTURED AND APPARATUS THEREOF

BACKGROUND OF THE INVENTION

1. Field of the Invention

The present invention relates to an optical disc drive, and more particularly, to a method of preventing an optical disc from being fractured due to a crack and apparatus thereof.

2. Description of the Background Art

In general, when revolutions per minute (rpm) is more than 10,000 rpm, an optical disc drive (data recording/reproducing apparatus) records data in the optical disc or reproduces the data of the optical disc. In addition, a CD spin rate or speed (X) of the present drives of DVD (Digital Video Disc) or the like has steadily increased.

Meanwhile, when the optical disc is rotated at a high speed, if the optical disc is fractured, information stored in the optical disc is lost, the optical disc drive is damaged, and accidents may happen due to a fragment of the optical disc shot out of the optical disc drive.

Accordingly, in an optical disc drive according to the conventional art, in order to keep the fragment, generated when the optical disc is fractured, from being come out of the optical disc drive, a front cover of the optical disc drive is designed to be thick, and a coupling structure of a door on the optical disc drive is strengthened. However, a technique for preventing the optical disc from being fractured according to the conventional art is only a passive method, which is used after the optical disc has already been fractured.

Meanwhile, the optical disc drive according to the conventional art is disclosed in specifications of U.S. Pat. Nos. 5,737,289; 6,741,539; and 6,738,327.

SUMMARY OF THE INVENTION

Accordingly, an object of the present invention is to provide a method of preventing optical recording media from being fractured and apparatus thereof, which enable to protect an optical disc drive by detecting a crack, which causes a fracture on the optical disc, in advance and stopping an operation of the optical disc drive.

It is another object of the present invention to provide the method of preventing the optical recording media from being fractured and apparatus thereof, which enable to determine whether there is a crack on the optical disc by telling the crack on the optical disc from a scratch.

It is another object of the present invention to provide the method of preventing the optical recording media from being fractured and apparatus thereof, which enable to protect the optical disc by reading data in a lead-in area of the optical disc and determining whether or not there is the crack on the optical disc on the basis of the read result.

To achieve these and other advantages and in accordance with the purpose of the present invention, as embodied and broadly described herein, the method of preventing the optical recording media from being fractured includes: detecting a first tracking error signal outputted from a data recording/reproducing apparatus when the optical recording media are rotated at a first speed; detecting a second tracking error signal outputted from the data recording/reproducing apparatus when the optical recording media are rotated at a second speed; determining whether or not the optical recording media have the crack on the basis of the first and second tracking error signals; and stopping the operation of the data recording/reproducing apparatus when the optical recording media have the crack.

To achieve these and other advantages and in accordance with the purpose of the present invention, as embodied and broadly described herein, the method of preventing the optical recording media from being fractured includes: detecting a first focus error signal outputted from the data recording/reproducing apparatus when the optical recording media are rotated at a low speed; detecting a second focus error signal outputted from the data recording/reproducing apparatus when the optical recording media are rotated at a high speed; determining whether or not the optical recording media have the crack on the basis of the first and second focus error signals; and stopping the operation of the data recording/reproducing apparatus when the optical recording media have the crack.

To achieve these and other advantages and in accordance with the purpose of the present invention, as embodied and broadly described herein, the apparatus for preventing the optical recording media from being fractured detects a voltage level of a first tracking error signal or of a first focus error signal generated when the optical recording media are rotated at the low speed, and the voltage level of a second tracking error signal or of a second focus error signal generated when the optical recording media are rotated at a high speed, and stops the operation of the data recording/reproducing apparatus when the voltage level of the second tracking error signal is higher than that of the first tracking error signal or when the voltage level of the second focus error signal is higher than that of the first focus error signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3A is a voltage waveform diagram of a tracking error signal generated when a normal optical disc without a crack is rotated;

FIG. 3B is a voltage waveform diagram of a tracking error signal generated when an optical disc with a crack is rotated at a low speed;

FIG. 3C is a voltage waveform diagram of a tracking error signal generated when an optical disc with a crack is rotated at a high speed;

DETAILED DESCRIPTION OF THE PREFERRED EMBODIMENTS

Hereinafter, the preferred embodiments of a method of preventing optical recording media from being fractured and apparatus thereof, which enable to prevent an optical disc from being fractured and protect the optical disc by determining whether or not a crack on the optical disc exists and stopping an operation of the optical disc drive when the crack on the optical disc exists, will now be described in detail with reference to FIGS. 1 to 10.

Figure 1:
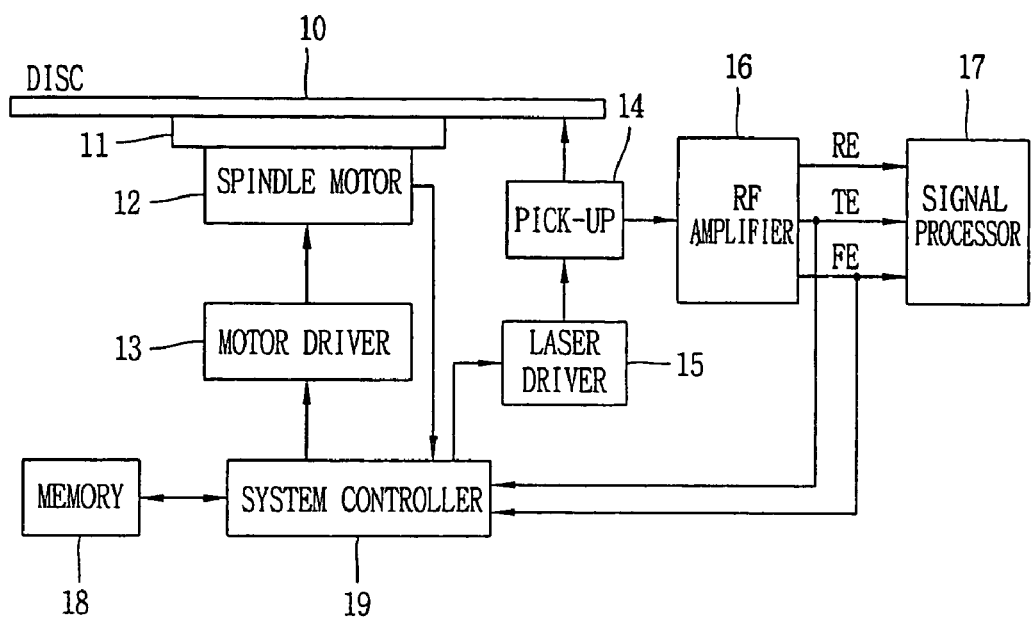
FIG. 1 is a diagram of the configuration of an optical disc drive to which a method of preventing an optical disc from being fractured according to the present invention is applied.

FIG. 1 is a diagram of the configuration of an optical disc drive to which a method of preventing an optical disc from being fractured according to the present invention is applied.

As shown in FIG. 1, the optical disc drive includes: a spindle motor 12 for rotating the optical disc (optical recording media) installed at a turn table 11; a motor driver 13 for controlling the spindle motor 12; a pick-up 14 for irradiating laser beams on the optical disc 10 through a laser diode (not shown) and converting an optical signal reflected from the optical disc 10 into an electrical signal; an RF amplifier 16 for converting the electrical signal (an electrical current) into a voltage and generating a radio frequency signal (RF), a tracking error signal (TE) and a focus error signal (FE) on the basis of the converted voltage; a signal processor 17 for reproducing data recorded in the optical disc 10 on the basis of the RF, TE and FE signals; a laser driver 15 for generating a driving current for generating laser beams; a system controller 19 for detecting rotation information of the spindle motor 12 on the basis of an FG pulse signal outputted from the spindle motor 12, controlling the motor driver 13 on the basis of the rotation information so that the spindle motor 12 is driven at a target rotation speed, controlling a tracking and a focusing of the optical disc 10 on the basis of the TE signal and the FE signal outputted from the RF amplifier 16 and determining whether or not the crack on the optical disc exits on the basis of the TE signal or the FE signal; and a memory 18 for storing various programs and data for driving the optical disc drive.

The system controller 19, if the optical disc 10 has the crack, stops the spindle motor 12 through the motor driver 13, thereby preventing the optical disc from being fractured due to the crack. For instance, the system controller 19 detects a voltage level of a first tracking error signal generated when the optical disc 10 is rotated at a low speed and of a second tracking error signal generated when the optical disc 10 is rotated at a high speed and stops the operation of the optical disc drive if the voltage level of the second tracking error is higher than that of the first tracking error signal. In addition, the system controller 19 detects a voltage level of a first focus error signal generated when the optical disc 10 is rotated at the low speed and of a second focus error signal generated when the optical disc 10 is rotated at the high speed and can stop the operation of the optical disc drive if the voltage level of the second focus error is higher than that of the first focus error signal.

Hereinafter, the operation of the optical disc drive to which the method of preventing the optical disc from being fractured is applied will be described.

First, the optical disc 10 is loaded on the turn table 11 and rotated at a constant linear velocity (CLV), a constant angular velocity (CAV) or a particle constant angular velocity (PCAV) by the spindle motor 12 driven by the motor driver 13.

The pick-up 14, which includes a laser diode for generating laser beams, a photodetector for detecting a reflected light and various optical lenses, irradiates laser beams outputted from the laser diode onto the optical disc, detects the optical signal reflected from the optical disc 10 through the photodetector, converts the optical signal into an electrical signal and applies the electrical signal to the RF amplifier 16.

The RF amplifier 16, which includes a current-to-voltage converter circuit and a matrix operation/amplification circuit, converts the electrical signal (the electrical current) into a voltage and, based on the converted voltage, generates a tracking error signal (TE) and a focus error signal (FE) for controlling a servo. The RF signal, tracking error signal (TE) and focus error signal (FE) are general signals, and thus detailed explanation for them is omitted.

The signal processor 17, which includes hardware and software for performing EFM (Eight to Fourteen Modulation) demodulation, MPEG (Moving Picture Experts Group, MPEG) demodulation and error correction, reproduces data recorded in the optical disc 10.

The laser driver 15 generates a driving current under the control of the system controller 19 and applies the driving current to the laser diode of the pick-up 14. Herein, the laser diode of the pick-up 14 is provided with the driving current and generates laser beams.

Thereafter, rotating the optical disc 10, the system controller 19 reads the data recorded in the form of pits and lands created on the optical disc through the pick-up 14, the RF amplifier 16 and the signal processor 17. At this time, a frequency generator (FG) (not shown) of the spindle motor 12 outputs an FG pulse signal synchronized with the rotation of the spindle motor 12 to the system controller 19.

The system controller 19 detects rotation information of the spindle motor 12 on the basis of the FG pulse signal, controls the spindle motor 12 through the motor driver 13 so that the spindle motor 12 is rotated at a target rotation speed on the basis of the rotation information and controls a tracking and a focusing of the optical disc 10 on the basis of the tracking error signal (TE) and the focus error signal (FE) outputted from the RF amplifier 16.

In addition, the system controller 19 determines whether the optical disc 10 has the crack on the basis of the tracking error signal (TE) or the focus error signal (FE) and, if the optical disc 10 has the crack, by stopping the spindle motor 12 through the motor driver 13, prevents the optical disc 10 from being fractured due to the crack. Namely, the inventor of the present invention has found out the fact through many times of trial and error that, if the optical disc with the crack is rotated at a high speed, the voltage level of the tracking error signal (TE) or of the focus error signal (TE) increases.

Therefore, hereinafter, a method of precisely detecting the crack of the optical disc 10 on the basis of the tracking error signal (TE) or the focus error signal (FE) to be changed when the optical disc 10 with the crack is rotated at a low speed or a high speed will be described in detail with reference to FIGS. 2A to 8.

Figure 2A:
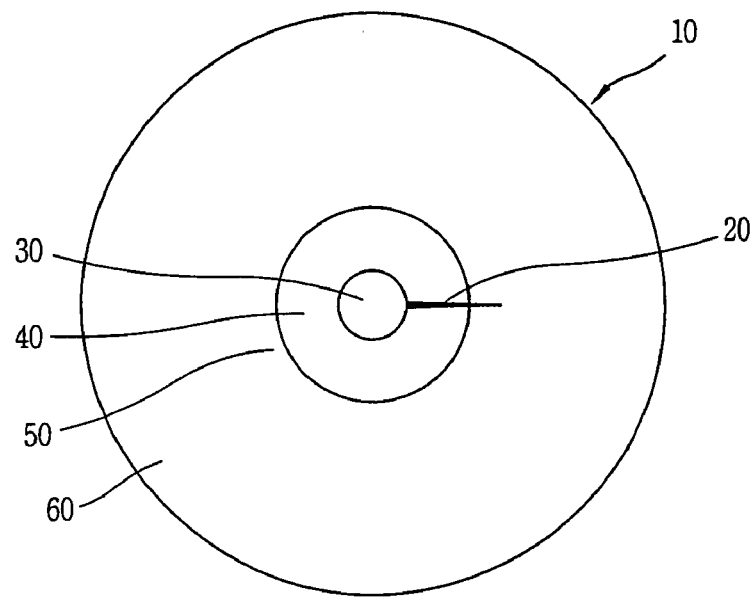
FIGS. 2A and 2B are exemplary views for describing that a crack gets wider when an optical disc with the crack is rotated at a high speed.
Figure 2B:
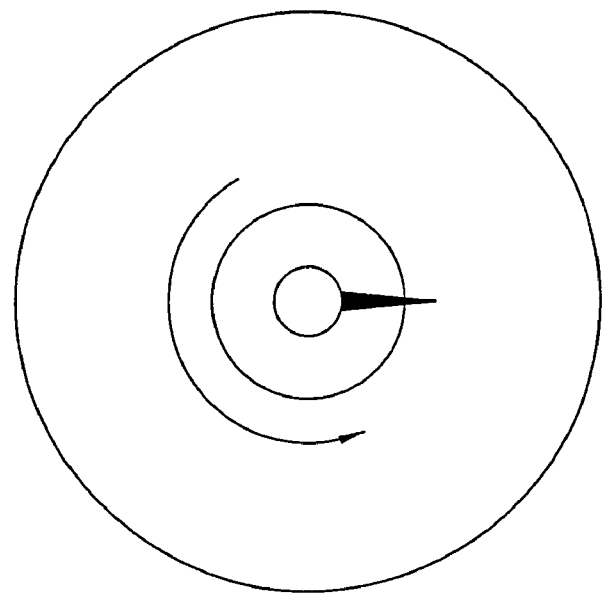

FIGS. 2A and 2B are exemplary views for describing that a crack (crevice) gets wider when an optical disc 10 (optical recording media) with the crack is rotated at a high speed. The optical disc 10 includes a center hole 30, a clamping area 40, a lead-in area 50 and a lead-out area 60.

As shown in FIG. 2A, when the optical disc 10 with the crack 20 is not rotated but stopped, a width of the crack 20 is very small. However, as shown in FIG. 2B, if the optical disc 10 with the crack 20 is rotated from a low speed to a high speed, the width of the crack 20 gradually gets wider due to the centrifugal force applied to mass of the optical disc itself. A phenomenon that the crack 20 gets wider can be confirmed by detecting a voltage waveform of the tracking error signal or the voltage waveform of the focus error signal.

Hereinafter, a voltage waveform of the tracking error signal will be described with reference to FIGS. 3A to 3C.

FIG. 3A is a voltage waveform diagram of a tracking error signal generated when an optical disc without a crack is rotated.

FIG. 3B is a voltage waveform diagram of a tracking error signal generated when an optical disc with a crack is rotated at a low speed.

FIG. 3C is a voltage waveform diagram of a tracking error signal generated when an optical disc with a crack is rotated at a high speed.

As shown in FIGS. 3A to 3C, it is found out through many times of trial and error that, as the optical disc with the crack is rotated at a low speed or a high speed, a voltage value of the tracking error signal increases, and a width of the crack 20 at a high-speed rotation gets wider than at a low-speed rotation. Accordingly, in the present invention, it is determined whether or not the crack 20 on the optical disc 10 exists on the basis of a signal level of the tracking error signal generated when the optical disc 10 is rotated at a low speed or high speed.

Moreover, in the present invention, it can be determined whether or not the crack 20 on the optical disc 10 exists on the basis of the signal level of the focus error signal. For instance, as the crack 20 on the optical disc 10 gets wider by a rotatory force, the signal level of the focus error signal increases. Based on the signal level of the increased focus error signal, it can be determined whether or not the crack 20 on the optical disc 10 exists.

Hereinafter, a method of detecting a crack 20 on an optical disc 10 will be explained in detail with reference to FIG. 4.

Figure 4:
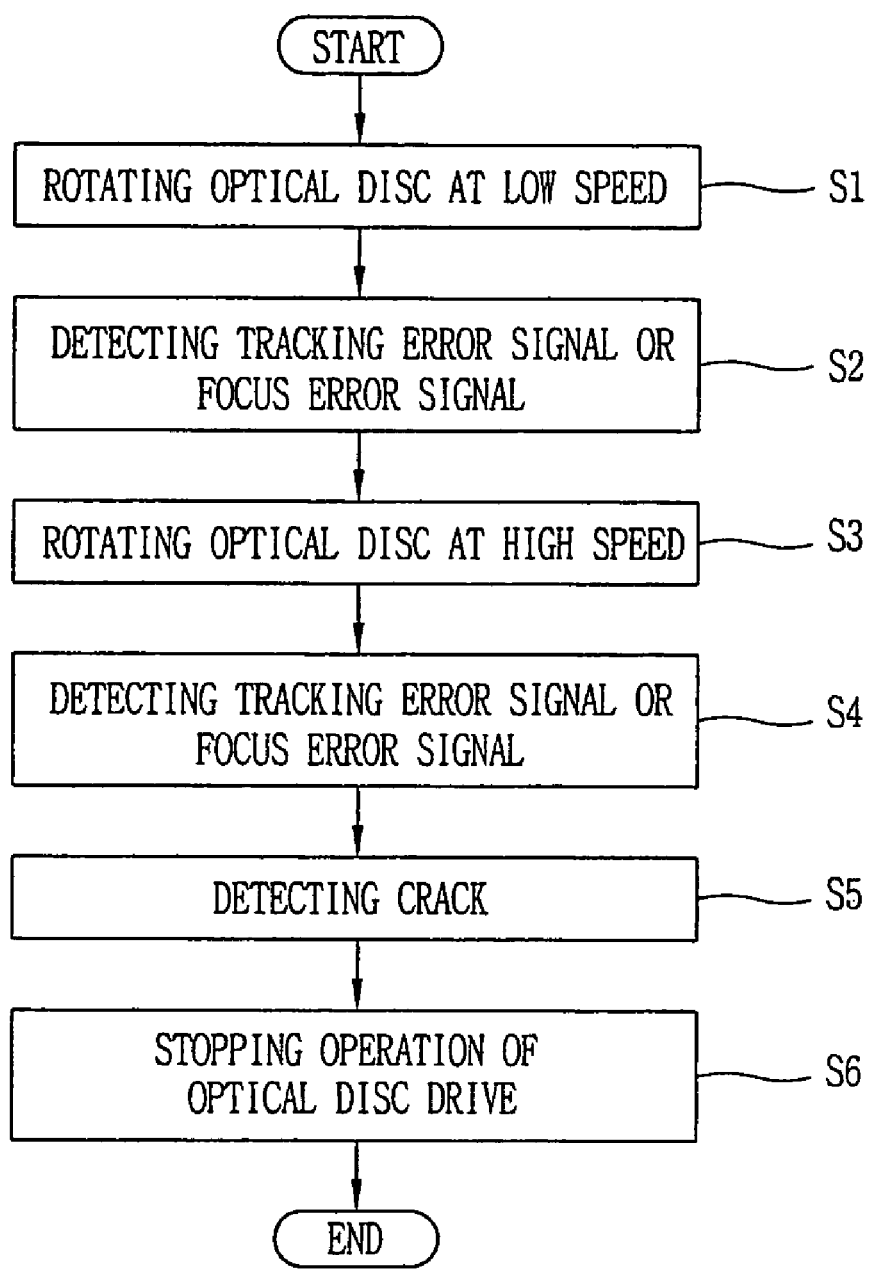
FIG. 4 is a flowchart of a method of detecting a crack on an optical disc according to the present invention.

FIG. 4 is a flowchart of a method of detecting a crack on an optical disc according to the present invention.

Firstly, the spindle motor 12 rotates the optical disc 10 for a predetermined time $T_s$, for example, 3 to 5 seconds at a low speed on the basis of a control signal of the system controller 19 (S1). At this time, the system controller 19 measures a voltage level of a tracking error signal (TE) or of a focus error signal (FE) outputted from the RF amplifier 16 and calculates a voltage average value of a first abnormal pulse and an average value of a dwell time of the first abnormal pulse on the basis of the voltage level of the measured tracking error signal (TE) or focus error signal (FE). Here, the abnormal pulse means a pulse signal of the tracking error signal (TE) generated when the optical disc with the crack is rotated. Namely, the tracking error signal generated when the optical disc without the crack is rotated has a normal pulse signal, while the tracking error signal generated when the optical disc with the crack is rotated has an abnormal signal (S2).

Thereafter, the spindle motor 12 is rotated at the high speed for the predetermined time $T_s$ on the basis of the control signal of the system controller 19 (S3). At this time, the system controller 19 measures the voltage level of the tracking error signal (TE) or of the focus error signal (FE) outputted from the RF amplifier 16 and calculates the voltage average value of a second abnormal pulse and the average value of the dwell time of the second abnormal pulse (S4).

The system controller 19 compares the voltage average value of the first abnormal pulse with the voltage average value of the second abnormal pulse, determines the optical disc 10 has the crack if the voltage average value of the second abnormal pulse is greater than that of the first abnormal pulse (S5) and stops driving of the spindle motor 12 (S6).

In addition, the system controller 19 compares the voltage average value of the first abnormal pulse with the voltage average value of the second abnormal pulse, determines the optical disc 10 has the crack if the average value of the dwell time of the second abnormal pulse is greater than that of the first abnormal pulse (S5) and stops driving of the spindle motor 12 (S6).

Meanwhile, the system controller 19 compares a voltage average value of a preset normal pulse with the voltage average value of the first abnormal pulse or with the voltage average value of the second abnormal pulse. If the voltage average value of the first abnormal pulse or the voltage average value of the second abnormal pulse is greater than that of the preset normal pulse, the system controller 19 determines the optical disc has the crack and can stop driving of the spindle motor 12.

Hereinafter, a process of calculating a voltage average value $V_{L,mean}$ of the first abnormal pulse and an average value $T_{L,mean}$ of a dwell time of the first abnormal pulse will be described in detail with reference to FIG. 5.

Figure 5:
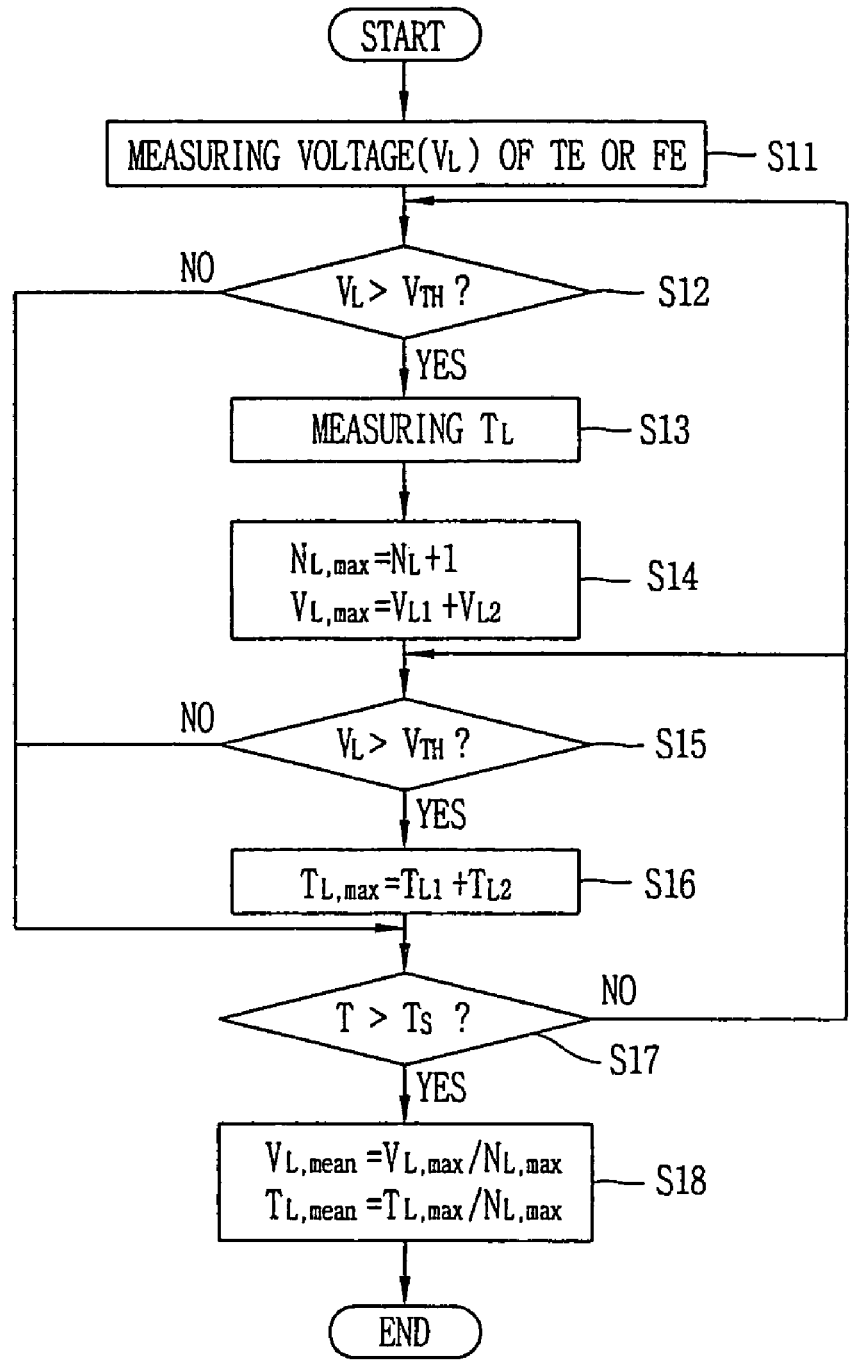
FIG. 5 is a flowchart of a method of calculating a voltage average value of a first abnormal pulse and an average value of a dwell time of the first abnormal pulse.

FIG. 5 is a flowchart of a method of calculating a voltage average value $V_{L,mean}$ of a first abnormal pulse and an average value $T_{L,mean}$ of a dwell time of the first abnormal pulse.

Firstly, the system controller 19 receives a first tracking error signal TE or a first focus error signal FE generated when the optical disc 10 is rotated at a low speed and measures a voltage level $V_L$ of the received first tracking error signal TE or of the first focus error signal FE (S11). If the measured voltage levels $V_L$ are greater than a preset threshold voltage $V_{TH}$ (S12), the system controller 19 determines that an abnormal pulse is included in the first tracking error signal or the first focus error signal, and simultaneously generates a clock signal and measures elapse time of the clock signal. Herein, the clock signal is generated to measure the dwell time $T_L$ of the abnormal pulse (S13).

The system controller 19 increases the generation number $N_L$ of the abnormal pulse as many as 1 whenever the abnormal pulse is generated, adds up the voltage levels ($V_{L1}$+ $V_{L2}$ ... +$V_{LN}$) of the abnormal pulse and stores the added voltage $V_{L,max}$ in the memory 18 (S14).

The system controller 19 adds up dwell times $T_L$ ($T_{L1}$+ $T_{L2}$ ... +$T_{LN}$) of the abnormal pulse whenever the voltage level $V_L$ of the abnormal pulse is not greater than or equal to the preset threshold voltage $V_{TH}$, and stores the added dwell time $T_{L,max}$ to the memory 18 (S16). A process of adding up and storing the voltage levels $V_L$ of the abnormal pulse is terminated if time T passing after the optical disc 10 is rotated at the low speed elapses a preset time $T_s$, that is, if T becomes greater than $T_s$ (S17).

Thereafter, the system controller 19 obtains the voltage average value $V_{L,mean}$ of the first abnormal pulse by dividing the added voltage $V_{L,max}$ of the abnormal pulse by the total generation number $N_{L,max}$ of the abnormal pulse and obtains a dwell time average value $T_{L,mean}$ of the first abnormal pulse by dividing the added dwell time $T_{L,max}$ of the abnormal pulse by the total generation number $N_{L,max}$ of the abnormal pulse.

After all, the voltage average value $V_{L,mean}$ of the first abnormal pulse is calculated by adding up the voltage level values ($V_{L,max}=V_{L1}+V_{L2}$) measured whenever the voltage level $V_L$ of the tracking error signal or of the focus error signal is greater than the preset threshold voltage $V_{TH}$, counting the number of the additions ($N_{L,max}=N_L+1$) and dividing the added voltage level value $V_{L,MAX}$ by the counted number $N_{L,max}$ ($V_{L,mean}=V_{L,max}/N_{L,max}$). In addition, the dwell time average value $T_{L,mean}$ of the first abnormal pulse is calculated by adding up the abnormal pulse dwell times ($T_{L,MAX}=T_{L1}+T_{L2}$) measured whenever the voltage level of the tracking error signal or of the focus error signal is not greater than or equal to the preset threshold voltage $V_{TH}$, counting the number of the additions ($N_{L,max}=N_L+1$) and dividing the added dwell time $T_{L,MAX}$ by the counted number $N_{L,max}$ ($T_{L,mean}=T_{L,max}/N_{L,max}$) (S18).

Thereafter, the system controller 19 rotates the spindle motor 12, being rotated at the low speed, at the high speed and repeats adding up and storing the voltage levels $V_L$ during the preset time. Namely, rotating the optical disc 10 at the high speed, the system controller 19 detects the tracking error signal or the focus error signal and calculates the voltage average value and the dwell time average value of the second abnormal pulse of the detected tracking error signal or of the focus error signal.

Hereinafter, a process of calculating the voltage average value $V_{H,mean}$ of the second abnormal pulse and the dwell time average value $T_{H,mean}$ of the second abnormal pulse will be described in detail with reference to FIG. 6.

Figure 6:
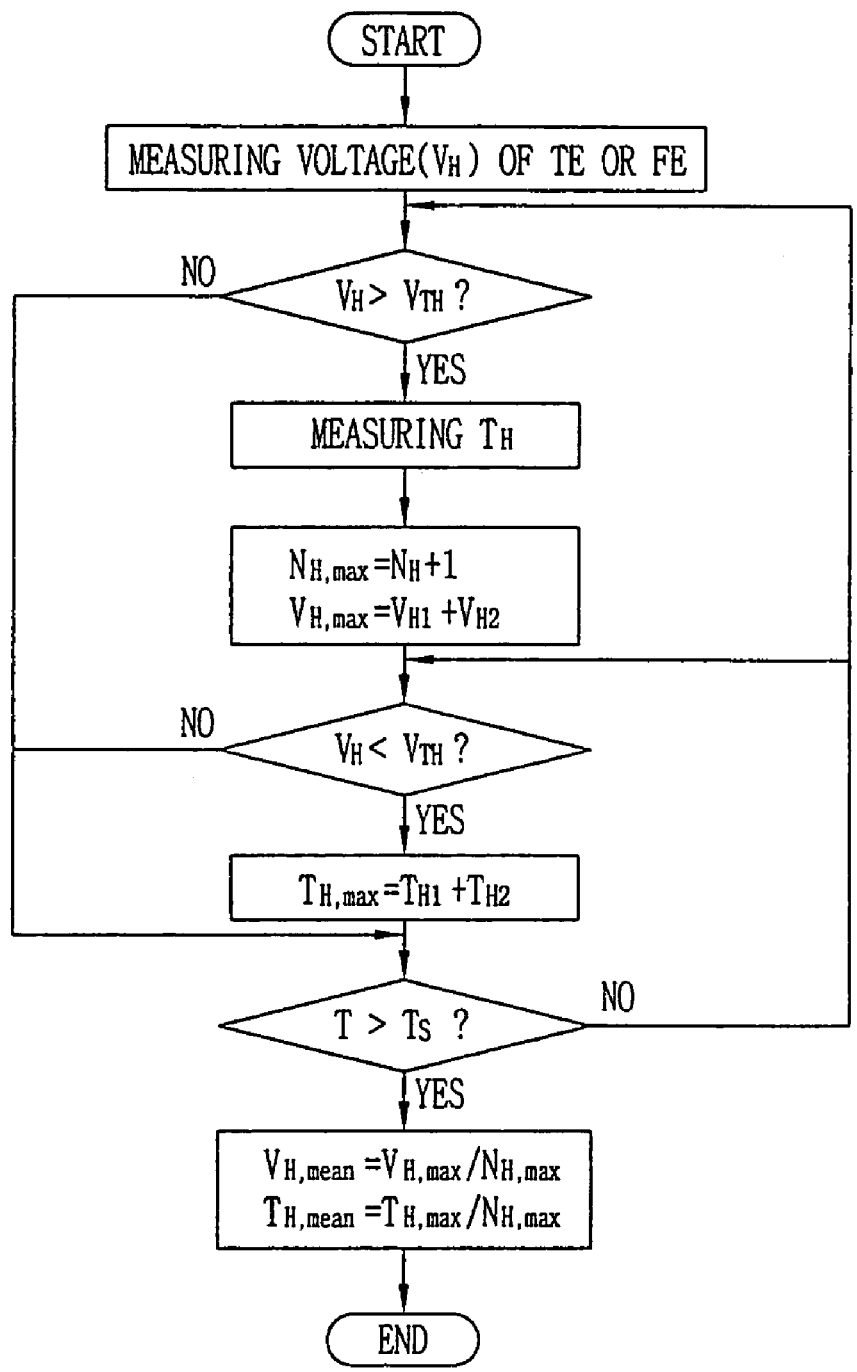
FIG. 6 is a flowchart of a method of calculating a voltage average value of a second abnormal pulse and a dwell time average value of the second abnormal pulse.

FIG. 6 is a flowchart of a method of calculating a voltage average value $V_{H,mean}$ of a second abnormal pulse and a dwell time average value $T_{H,mean}$ of the second abnormal pulse.

As shown in FIG. 6, a process of calculating the voltage average value of the second abnormal pulse and the dwell time average value of the second abnormal pulse is the same as the process of FIG. 5. Namely, the voltage average value $V_{H,mean}$ of the second abnormal pulse is calculated by adding up the level values ($V_{H,max}=V_{H1}+V_{H2}$) measured whenever the voltage level $V_H$ of the tracking error signal or of the focus error signal is greater than the preset threshold voltage $V_{TH}$, counting the number of the additions ($N_{H,max}=N_H+1$) and dividing the added level value $V_{H,MAX}$ by the counted number $N_{H,max}$ ($V_{H,mean}=V_{H,max}/N_{H,max}$). In addition, the dwell time average value $T_{H,mean}$ of the second abnormal pulse is calculated by adding up the abnormal pulse dwell times ($T_{H,MAX}=T_{H1}+T_{H2}$) measured whenever the level $V_H$ of the tracking error signal or focus error signal is greater than the preset threshold voltage $V_{TH}$, counting the number of the additions ($N_{H,max}=N_H+1$) and dividing the added dwell time $T_{H,MAX}$ by the counted number $N_{H,max}$ ($T_{H,mean}=T_{H,max}/N_{H,max}$).

Hereinafter, a process of determining whether or not the optical disc has the crack will be described in detail with reference to FIG. 7 on the basis of the tracking error signal or the focus error signal, that is, the voltage average value $V_{L,mean}$ of the first abnormal pulse and the voltage average value $V_{H,mean}$ of the second abnormal pulse or the time dwell average value $T_L$,mean of the first abnormal pulse and the time dwell average value $T_{H,mean}$ of the second abnormal pulse.

Figure 7:
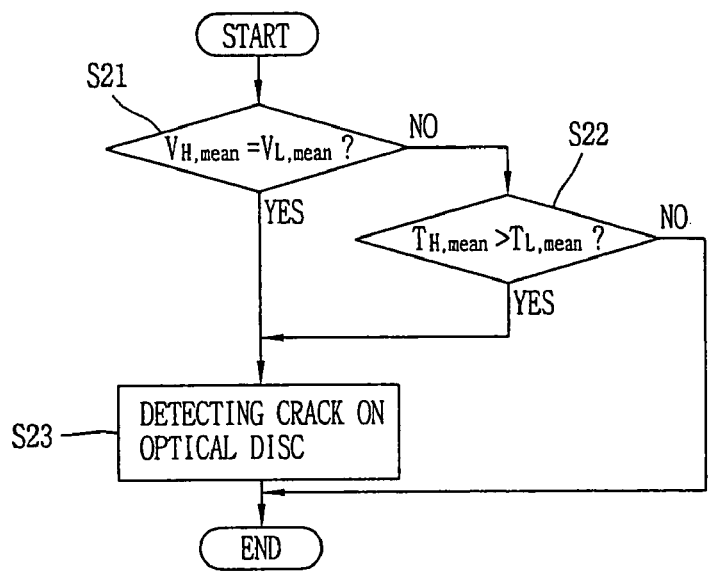
FIG. 7 is a flowchart of a method of determining whether or not an optical disc has a crack on the basis of an abnormal pulse signal of a tracking error signal or of a focus error signal.

FIG. 7 is a flowchart of a method of determining whether or not an optical disc has a crack on the basis of the tracking error signal or of the focus error signal.

Firstly, the system controller 19 determines whether the voltage average value of the second abnormal pulse is greater than that of the first abnormal pulse ($V_{H,mean}>V_{L,mean}$) (S21). The system controller 19 determines the optical disc 10 has the crack when the voltage average value of the second abnormal pulse is greater than that of the first abnormal pulse (S23).

Moreover, in order to precisely detect the crack on the optical disc, it is desirable to determine whether the voltage average value of the second abnormal pulse is a preset value greater than that of the first abnormal pulse ($V_{H,mean}>V_{L,mean}+\alpha$). That is to say, it is desirable to determine the optical disc 10 has a crack when the voltage average value of the second abnormal pulse is a preset value greater than that of the first abnormal pulse. Here, if the optical disc with the crack is rotated from a low speed to a high speed and the crack does not get wider, the voltage average value of the first abnormal pulse almost coincides with the voltage average value of the second abnormal pulse.

For example, since a width of a crack comparatively changes a little when an optical disc with the large crack is rotated from a low speed to a high speed, the voltage average values of the first abnormal pulse and of the second abnormal pulse rarely change. Accordingly, it is desirable to determine whether the optical disc has the crack on the basis of the dwell time average values of the first and second abnormal pulses. Namely, if the crack on the optical disc exists, the dwell time of the abnormal pulse at a high-speed rotation exceeds that of the abnormal pulse at a low-speed rotation.

Therefore, when the voltage average value of the second abnormal pulse does not change compared to that of the first abnormal pulse, the system controller 19 determines whether the dwell time average value of the second abnormal pulse is greater than the dwell time average value of the first abnormal pulse ($T_{H,mean}>T_{L,mean}$) (S22). Namely, the system controller 19 determines there is no crack on the optical disc when the dwell time average value of second abnormal pulse coincides with the dwell time average value of the first abnormal pulse.

Hereinafter, a method of controlling an optical disc drive when a crack on the disc is detected will be described in detail with reference to FIG. 8.

Figure 8:
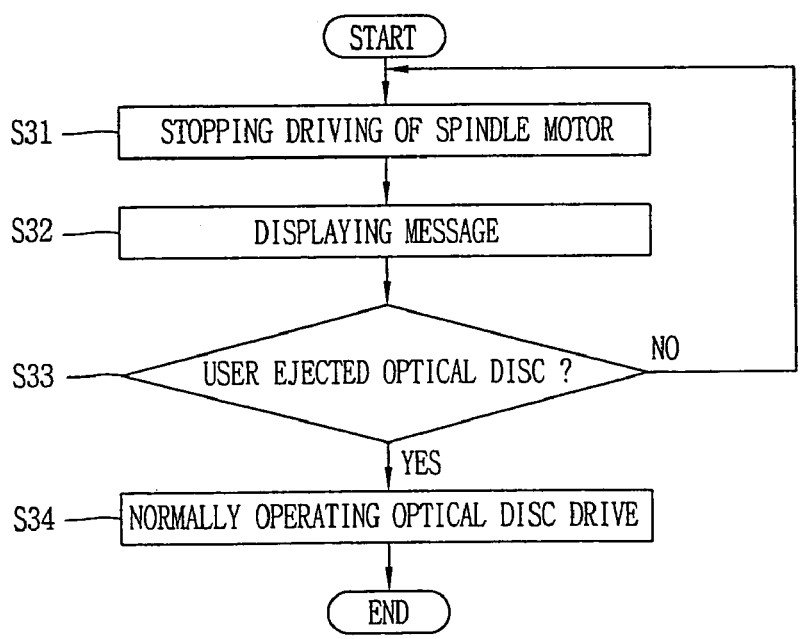
FIG. 8 is a flowchart of a method of controlling an optical disc drive when a crack on an optical disc is detected.

FIG. 8 is a flowchart of a method of controlling an optical disc drive when a crack on an optical disc is detected.

Firstly, if the crack on the optical disc 10 exists, the system controller 19 stops driving of the spindle motor 12 (S31).

The system controller 19 stops driving of the spindle motor 12 and then displays "a message showing a crack has been generated on an optical disc" and "a message telling to check the optical disc" on a display unit (not shown) of the optical disc drive (S32). At this time, the system controller 19 determines whether a user ejects to check the optical disc 10. Namely, by determining whether the user presses an eject button (not shown) of the optical disc drive so as to eject the optical disc 10, the system controller 19 easily can check whether the user has ejected the optical disc 10 (S33). Here, the messages also can be displayed on a monitor (not shown) of a host computer (not shown) connected to the optical disc drive.

Thereafter, according to the checking message, the user ejects the optical disc from the optical disc drive and checks with the unaided eyes whether the optical disc has the crack indeed. Here, if the user does not eject the optical disc 10, the system controller 19 continuously stops an operation of the spindle motor 12. If the user checks the optical disc and then loads a new one on the optical disc drive, the system controller 19 normally operates the optical disc drive (S34).

Hereinafter, the method of preventing the optical disc from being fractured according to the present invention will be described in detail with reference to FIG. 9.

Figure 9:
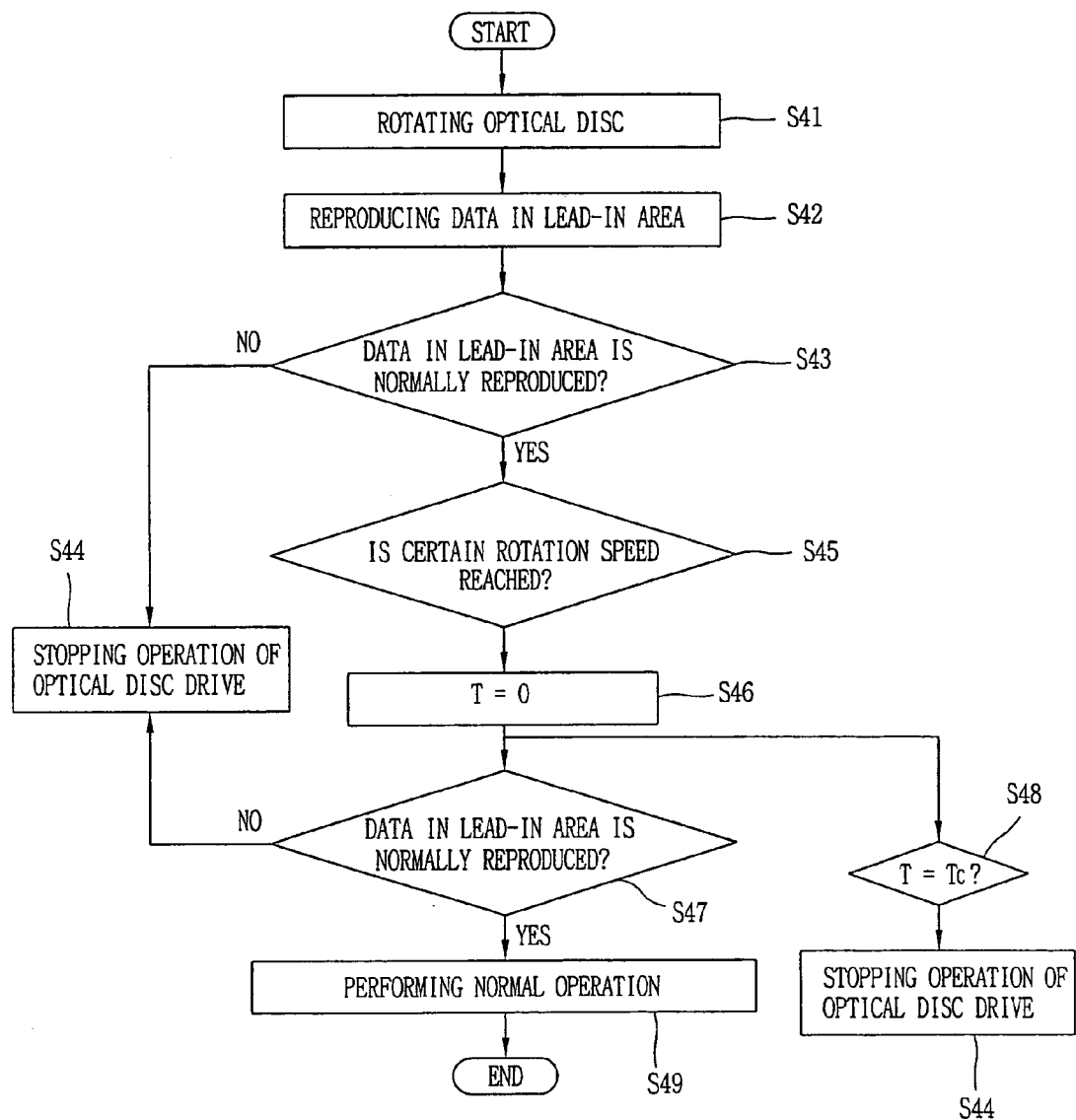
FIG. 9 is a flowchart of a method of preventing an optical disc from being fractured according to the present invention.

FIG. 9 is a flowchart of a method of preventing an optical disc from being fractured according to the present invention.

Firstly, if the optical disc 10 is loaded on the turntable 11, the system controller 19 rotates the spindle motor 12 so as to rotate the optical disc 10 at a certain speed, for example, more than 10,000 rpm (S41). Here, the optical disc 10 starts to be gradually rotated to reach the certain speed, e.g., 10,000 rpm in a few seconds.

When the optical disc 10 starts to be rotated, the system controller 19 locates object lens of the pick-up 14 in a lead-in area (range of the 46 to 50 mm diameter location on the optical disc) and displays data in the lead-in area (S42).

Thereafter, the system controller 19 determines whether the data in the lead-in area is normally reproduced (S43) and, if the data in the lead-in area is reproduced abnormally, stops driving of the optical disc drive by determining that a problem, e.g., a contaminant, happens in the lead-in area (S44). Here, by detecting whether a reproducing signal, generated when the data is reproduced, has a distortion or not, it can be easily determined whether the data in the lead-in area is normally reproduced.

On the other hand, if the data in the lead-in area is normally displayed, the system controller 19 determines that the optical disc reached the certain speed (S45) and resets the optical disc drive and a timer (not shown) when the optical disc reached at the certain speed (S46). Herein, the timer is used to set a period (time) for checking the lead-in area of the optical disc to be a little shorter than a fracture limit time $T_c$ after the optical disc 10 starts to be rotated and then is sped up to the certain speed. The fracture limit time means the time required that the optical disc is fractured due to the crack when the optical disc with the crack is rotated at a high speed, and the fracture limit time $T_c$ is preset by an experiment.

When the optical disc reached the certain speed, the system controller 19 determines whether the data in the lead-in area is normally reproduced (S47) and, if the data in the lead-in area is abnormally reproduced, determines the optical disc 10 has the crack and at the same time stops driving of the optical disc drive (S44). On the other hand, if the data in the lead-in area is normally reproduced when the optical disc reaches the certain speed, the system controller 19 normally operates the optical disc drive according to a general optical disc reproducing/recording method (S49).

Meanwhile, determining whether the data in the lead-in area is normally reproduced (S47), the system controller 19 determines the time T passing after the optical disc reaches the certain speed elapses the fracture limit time $T_c$ (S48). In case the passed time T elapses the fracture limit time $T_c$, the system controller 19 stops driving of the optical disc drive (S44). Accordingly, the optical disc 10 is rotated at the certain speed, the lead-in area is checked every period which is shorter than the fracture limit time $T_c$, using the timer. Namely, another method of preventing the optical disc from being fractured according to the present invention is to determine whether the crack 20 on the optical disc 10 exists by checking the lead-in area, whereby it is easily detected whether the crack on the disc exists without a separate unit for detecting the crack 20 on the disc 10.

Hereinafter, when the optical disc with the crack is rotated at a high speed, a phenomenon that the optical disc is fractured due to the crack will be described in detail with reference with FIG. 10.

Figure 10:
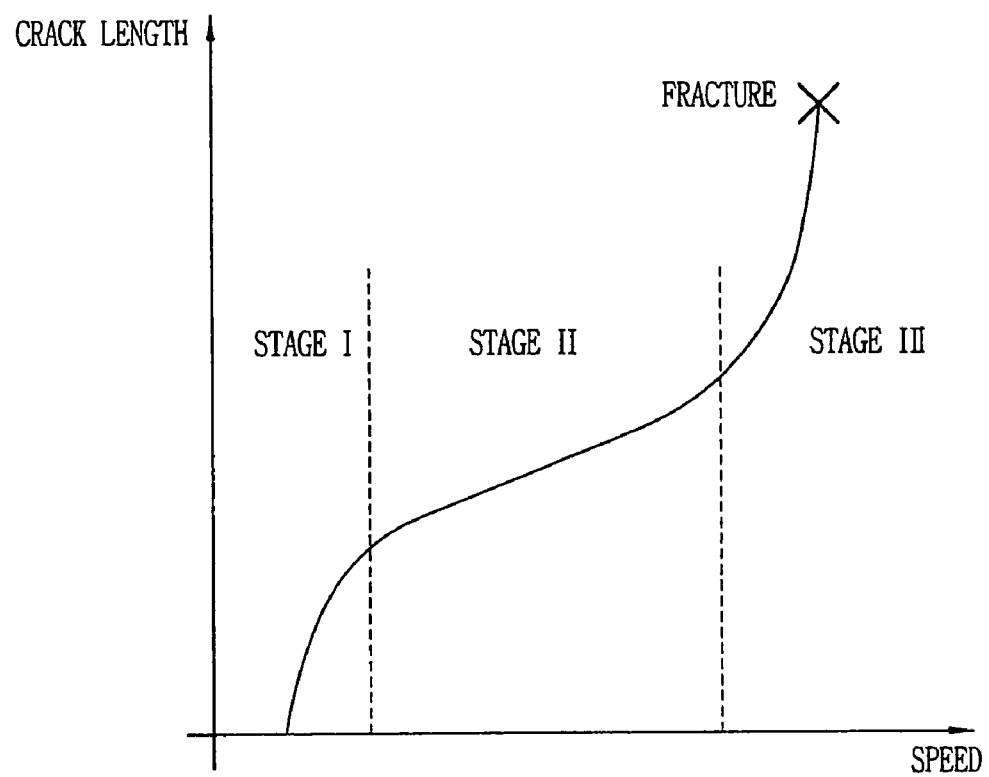
FIG. 10 is a graph for showing that the optical disc is fractured due to the crack.

FIG. 10 is a graph for showing that the optical disc is fractured due to the crack.

As shown in FIG. 10, a process that the crack on the optical disc advances includes a stage I the in which an early crack is generated, a stage II in which the crack gradually advances and a stage III in which the speed at which the crack gets wider is so high that the optical disc is fractured. Here, a crack length required to cause a fracture is referred to as a critical crack length.

If the optical disc 10 has the crack, unlike a general scratch or trace, a recording surface on the optical disc itself is transformed due to the crack, and thus a signal in a crack area is distorted, whereby the signal cannot be reproduced or recorded in the signal processor 17. In addition, when the optical disc 10 has a mark or is stained with a contaminant, data (signal) of a portion having the trace and stained with the contaminant cannot be reproduced. However, though the data of the optical disc can be reproduced when the optical disc with the crack is rotated slowly, the data of the optical disc cannot be reproduced when the optical disc is rotated at the low high speed because the crack gets wider. Accordingly, it can be determined whether the optical disc has the crack by checking the data in the lead-in area until the optical disc is slowly rotated to reach the certain speed.

Meanwhile, the reason why the optical disc 10 is fractured due to the crack 20 is that the user, without being aware that the crack has advanced, continues to rotate the optical disc 10 at the high speed so as to reach the fracture limit time $T_c$. Accordingly, in case the optical disc 10 has to be continuously rotated at the certain speed, the optical disc can be prevented from being fractured by checking whether the optical disc has the crack, using the method of preventing the optical disc from being fractured and stopping rotation before reaching the fracture limit time $T_c$ if the crack on the optical disc exists.

Meanwhile, in another preferred embodiment of the present invention, a separate sensor is used to detect a crack. Namely, in case the amount of light reflected from the optical disc 10 is detected by a photo-interrupter and it is determined the amount of the reflected light as detected has an error, data in the lead-in area is reproduced by moving the pick-up 14 in the lead-in area, and it can be determined whether there is the crack on the disc 10 on the basis of the result of reproducing the data.

As so far described in detail, in the present invention, by distinguishing a crack from a scratch and more precisely determining whether the crack on the disc exists, a fracture of the optical disc and information loss can be prevented.

In addition, in the present invention, when the crack on the disc exists, by stopping the operation of the optical disc drive and making the user check the optical disc, a fracture of the optical disc drive due to the fracture of the optical disc can be prevented, and the user can be protected.

In addition, in the present invention, when the optical disc is rotated at the certain speed, it is determined whether data in the lead-in area of the optical disc is normally reproduced. Based on a result of such determination, it is determined that a crack, which causes a fracture on the optical disc, exists. If the optical disc has the crack, an operation of the optical disc drive is stopped. Accordingly, the optical disc can be prevented from being fractured due to the crack without a separate unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of preventing an optical recording medium from being fractured, the method comprising:
   detecting a first tracking error signal provided from a data recording/reproducing apparatus when the optical recording media is rotated at a first speed;
   detecting a second tracking error signal provided from the data recording/reproducing apparatus when the optical recording media is rotated at a second speed;
   determining whether the optical recording media is cracked by comparing a first abnormal pulse of the first tracking error signal and a second abnormal pulse of the second tracking error signal; and
   stopping an operation of the data recording/reproducing apparatus when the optical recording media is determined to be cracked,
   wherein determining whether the optical recording media is cracked comprises:
   calculating an average voltage value and an average dwell time value of the first abnormal pulse;
   calculating an average voltage value and an average dwell time value of the second abnormal pulse; and
   determining whether the optical recording media is cracked by comparing the average voltage values or the average dwell time values of the first abnormal pulse with the average voltage values or the average dwell time values of the second abnormal pulse.

2. The method of claim 1, wherein calculating the average voltage value of the first abnormal pulse comprises:
   summing the voltage level values of the first tracking error signal whenever the voltage level of the first tracking error signal is greater than a preset threshold voltage;
   counting the number of the voltage levels of the first tracking error signal whenever the voltage level of the first tracking error signal is greater than the threshold voltage; and
   dividing the sum of the voltage level values by the number of the voltage level values.

3. The method of claim 1, wherein calculating the average dwell time value of the first abnormal pulse comprises:
   summing the dwell times of the first tracking error signal whenever the voltage level of the first tracking error signal is greater than a preset threshold voltage;
   counting the number of the dwell times of the abnormal pulse whenever the voltage level of the first tracking error signal is greater than the preset threshold voltage; and
   dividing the sum of the dwell times by the number of dwell times.

4. The method of claim 1, wherein calculating the average voltage value of the second abnormal pulse comprises:
   summing the voltage level values of the first tracking error signal whenever the voltage level of the second tracking error signal is greater than a preset threshold voltage;
   counting the number of the voltage levels of the second tracking error signal whenever the voltage level of the second tracking error signal is greater than the threshold voltage; and
   dividing the sum of the voltage level values by the number of the voltage level values.

5. The method of claim 1, wherein calculating the average dwell time value of the second abnormal pulse comprises:
   summing the dwell times of the second tracking error signal whenever the voltage level of the second tracking error signal is greater than a preset threshold voltage;
   counting the number of the dwell times of the abnormal pulse whenever the voltage level of the first tracking error signal is greater than the preset threshold voltage; and
   dividing the sum of the dwell times by the number of dwell times.

6. The method of claim 1, wherein determining whether the optical recording media is cracked comprises:
   comparing the average voltage value of the second abnormal pulse with the average voltage value of the first abnormal pulse to determine whether the average voltage value of the second abnormal pulse is greater than that of the first abnormal pulse; and
   determining the optical recording media is cracked when the average voltage value of the second abnormal signal is greater than that of the first abnormal error signal.

7. The method of claim 6, further comprising:
   comparing the average dwell time value of the second abnormal pulse with the average dwell time value of the first abnormal pulse to determine whether the average dwell time value of the second abnormal pulse is greater than the average dwell time value of the first abnormal pulse; and
   determining the optical recording media is cracked when the average dwell time value of the second abnormal signal is greater than the average dwell time value of the first abnormal error signal.

8. The method of claim 7, further comprising:
   determining the optical recording media is not cracked when the average dwell time value of the first abnormal pulse coincides with the average dwell time value of the first abnormal pulse.

9. The method of claim 1, wherein determining whether the optical recording media is cracked comprises:
   comparing the average voltage value of the second abnormal pulse with the average voltage value of the first abnormal pulse to determine whether the average voltage value of the second abnormal pulse is greater than the average voltage value of the first abnormal pulse; and
   determining the optical recording media is cracked when the average voltage value of the second abnormal signal is greater than the average voltage value of the first abnormal error signal.

10. The method of claim 1, wherein determining whether the optical recording media is cracked comprises comparing an average voltage value of the first abnormal pulse of the first tracking error signal and an average voltage value of the second abnormal pulse of the second tracking error signal.

11. The method of claim 1, wherein determining whether or not the optical recording media is cracked comprises comparing an average dwell time value of the first abnormal pulse and an average dwell time value of the second abnormal pulse.

12. A method of preventing an optical recording medium from being fractured, the method comprising:
   detecting a first focus error signal provided from a data recording/reproducing apparatus when the optical recording media is rotated at a low speed;
   detecting a second focus error signal from the data recording/reproducing apparatus when the optical recording media is rotated at a high speed;
   determining whether the optical disc is cracked by comparing a first abnormal pulse of the first focus error signal and a second abnormal pulse of the second focus error signal; and
   stopping an operation of the data recording/reproducing apparatus when the optical recording media is cracked, wherein determining whether the optical recording media is cracked comprises comparing an average voltage value of the first abnormal pulse with an average voltage value of the second abnormal pulse.

13. The method of claim 12, wherein determining whether or not the optical recording media is cracked comprises comparing an average dwell time value of the first abnormal pulse of the first focus error signal and an average dwell time value of the second abnormal pulse of the second focus error signal.

14. An apparatus for protecting optical recording media of a data recording/reproducing apparatus, the apparatus comprising:
- a controller configured to detect an average voltage level of a first abnormal pulse of a first tracking error signal or of a first abnormal pulse of a first focus error signal generated when the optical recording media is rotated at a low speed, and to detect an average voltage level of a second abnormal pulse of a second tracking error signal or of the focus error signal generated when the optical recording media is rotated at a high speed,
- wherein the controller is configured to stop the operation of the data recording/reproducing apparatus if the average voltage level of the second abnormal pulse of the second tracking error signal is higher than the average voltage level of the first abnormal pulse of the first tracking error signal or if the average voltage level of the second abnormal pulse of the second focus error signal is higher than the average voltage level of the first abnormal pulse of the first focus error signal.

15. The apparatus of claim 14, wherein the controller is further configured to stop the operation of the data recording/reproducing apparatus when the data of the lead-in area of the optical recording media is abnormally reproduced.

16. The apparatus of claim 14, wherein the controller is further configured to stop the operation of the data recording/reproducing apparatus if the data in the lead-in area of the optical recording media is normally reproduced when the optical recording media is rotated at the low speed and if the data in the lead-in area of the optical recording media is abnormally reproduced when the optical recording media is rotated at the high speed.

17. A data recording/reproducing apparatus comprising:
- a motor unit configured to rotate an optical recording media;
- an optical pick up unit configured to detect signals from the optical recording media;
- a signal processor configured to cooperate with the motor unit and the optical pick up unit to detect a first tracking error signal when the optical recording media is rotated at a first speed, and detect a second tracking error signal when the optical recording media is rotated at a second speed; and
- a system controller configured to cooperate with the motor unit, the optical pick up unit, and the signal processor to determine whether the optical recording media is cracked by comparing a first abnormal pulse of the first tracking error signal with a second abnormal pulse of the second tracking error signal, and to stop an operation of the motor unit when the optical recording media is determined to be cracked,
- wherein determining whether the optical recording media is cracked is performed by the system controller, and the system controller is further configured to
- calculate an average voltage value and an average dwell time value of the first abnormal pulse,
- calculate an average voltage value and an average dwell time value of the second abnormal pulse, and
- determine whether the optical recording media is cracked by comparing the average voltage values or the average dwell time values of the first abnormal pulse with the average voltage values or the average dwell time values of the second abnormal pulse.

18. A data recording/reproducing apparatus comprising:
- a motor unit configured to rotate an optical recording media;
- an optical pick up unit configured to detect signals from the optical recording media;
- a signal processor configured to cooperate with the motor unit and the optical pick up unit to detect a first focus error signal when the optical recording media is rotated at a low speed, and to detect a second focus error signal when the optical recording media is rotated at a high speed; and
- a system controller configured to cooperate with the motor unit, the optical pick up unit, and the signal processor to determine whether the optical disc is cracked by comparing a first abnormal pulse of the first focus error signal and a second abnormal pulse of the second focus error signal, and to stop an operation of the motor unit when the optical recording media is cracked,
- wherein the system controller determines whether the optical recording media is cracked by comparing an average voltage value of the first abnormal pulse with an average voltage value of the second abnormal pulse.

* * * * *